(12) United States Patent
Song et al.

(10) Patent No.: US 8,667,982 B2
(45) Date of Patent: Mar. 11, 2014

(54) AIR VALVE DEVICE FOR AN INFLATABLE ARTICLE

(76) Inventors: Rong-Jyh Song, Taipei (TW); Tsung-Ping Yen, Taipei (TW)

(*) Notice: Subject to any disclaimer, the term of this patent is extended or adjusted under 35 U.S.C. 154(b) by 266 days.

(21) Appl. No.: 13/214,082

(22) Filed: Aug. 19, 2011

(65) Prior Publication Data
US 2012/0285552 A1    Nov. 15, 2012

(30) Foreign Application Priority Data
May 11, 2011    (CN) .................. 2011 2 0147815 U

(51) Int. Cl.
*F16K 15/20*    (2006.01)
*F16K 15/06*    (2006.01)

(52) U.S. Cl.
USPC ............. 137/232; 137/542; 251/83; 251/357

(58) Field of Classification Search
USPC ............... 137/223, 232, 522, 523, 541, 542; 251/82, 83, 101, 357
See application file for complete search history.

(56) References Cited

U.S. PATENT DOCUMENTS

| | | | | |
|---|---|---|---|---|
| 3,995,653 A * | 12/1976 | Mackal et al. | ............... | 137/223 |
| 4,004,614 A * | 1/1977 | Mackal et al. | ............... | 137/232 |
| 4,015,622 A * | 4/1977 | Pagani | ............... | 137/223 |
| 4,478,587 A * | 10/1984 | Mackal | ............... | 137/541 |
| 5,971,016 A * | 10/1999 | Wass et al. | ............... | 137/541 |
| 6,089,251 A * | 7/2000 | Pestel | ............... | 137/232 |
| 7,195,029 B2 * | 3/2007 | Wass | ............... | 137/223 |
| 7,401,619 B2 * | 7/2008 | Song et al. | ............... | 137/223 |
| 7,497,416 B2 * | 3/2009 | Wang | ............... | 137/232 |

* cited by examiner

*Primary Examiner* — John Rivell
(74) *Attorney, Agent, or Firm* — Christie, Parker & Hale, LLP

(57) ABSTRACT

An air valve device is adapted to be fitted into an opening of an inflatable article, and includes a valve seat having a seat body that is disposed between an inflating port and a conduit, and a valve disc unit disposed in the conduit to be moved between opened and closed positions, and having a valve disc connected with a plunger, an elastomeric seal ring superimposed on a padded region of the valve disc. A rigid retaining cap is disposed to bring a base layer of the seal ring in an abutting engagement with the padded region of the valve disc so as to secure the seal ring to the valve disc while permitting a sealing marginal layer of the seal ring to be air-tightly engaged with the seat body in the closed position.

6 Claims, 4 Drawing Sheets

AIR VALVE DEVICE FOR AN INFLATABLE ARTICLE

CROSS-REFERENCE TO RELATED APPLICATION

This application claims priority of Chinese Utility Model Application No. 201120147815.4, filed on May 11, 2011, the disclosure of which is herein incorporated by reference.

BACKGROUND OF THE INVENTION

1. Field of the Invention

This invention relates to an air valve device for an inflatable article, more particularly to an air valve device which ensures air-tightness when in a closed position.

2. Description of the Related Art

A conventional air valve device for an inflatable article, such as that disclosed in U.S. Pat. No. 7,401,619 B2, generally includes a valve seat, a movable member, and a biasing member. The valve seat includes a seat body and a tubular wall extending axially from the seat body. The seat body has a central mounting hole and a plurality of communicating holes arranged around the central mounting hole. The movable member includes a plunger which has a connected end that extends through the mounting hole to engage a valve disc, and a head that is operable to move the valve disc from a closed position, where the valve disc is in air-tight engagement with the seat body to shut off the communicating holes, to an opened position, where the valve disc is disengaged from the seat body to permit air to flow through the communicating holes, and an elastomeric seal ring which is attached to the valve disc to ensure air-tight engagement between the valve disc and the seat body. The biasing member is disposed to surround the plunger so as to bias the movable member to the closed position. However, due to the poor wearability inherent with the elastomeric seal ring, long-term subjection of the elastomeric seal ring to relatively large pressure within the inflatable article might result in undesired deformation of the elastomeric seal ring, which may cause air leakage from the inflatable article.

SUMMARY OF THE INVENTION

The object of the present invention is to provide an air valve device which can improve air-tight engagement between a valve disc and a seat body and prolong the service life of the valve disc.

According to this invention, the air valve device includes a valve seat which is adapted to be fitted into an opening of an inflatable article, and which has a tubular wall that surrounds and extends along an axis and that defines an accommodation space, and an abutment mount that extends from the tubular wall radially and towards the axis to form a seat body. The seat body is configured to divide the accommodation space into an inflating port distal from the inflatable chamber and a conduit proximate to an inflatable chamber of the inflatable article, and has a communicating port to fluidly communicate the inflating port with the conduit. The valve seat further has a hub member which is connected to the tubular wall through the seat body, and which defines therein a mounting hole that extends along the axis to communicate the inflating port with the conduit. A valve disc unit is disposed in the conduit and is movable relative to the abutment mount along the axis between a closed position, where the valve disc unit is in air-tight engagement with the seat body to shut off the communicating port, and an opened position, where the valve disc unit is disengaged from the seat body to permit air to flow through the communicating port to enter into or escape from the inflatable chamber. The valve disc unit has a valve disc having a seat body-side surface which is disposed to confront the seat body and which has a central region and a padded region that surrounds the central region, and an elastomeric seal ring having a base layer which is superimposed on the padded region, and a sealing marginal layer which is disposed on the base layer and which is abutted against and in air-tight engagement with the seat body when the valve disc unit is in the closed position. The sealing marginal layer is of such a thickness as to cooperate with the base layer to define an annular depression that surrounds the axis. The valve disc unit further has a retaining cap which is made from a material less deformable than the elastomeric seal ring, and which has a hub portion and a surrounding web portion that extends radially and outwardly from the hub portion, and that is fitted in the annular depression so as to bring the base layer in an abutting engagement with the padded region. A plunger has a connected end connected to the central region, and a rod portion which extends from the connected end along the axis through the hub portion and the mounting hole and which terminates at a head end that is disposed in the inflating port such that movement of the plunger along the axis relative to the abutment mount results in movement of the valve disc unit between the closed and opened positions. A biasing member is disposed to bias the head end to move away from the seat body so as to permit the valve disc unit to be held in the closed position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
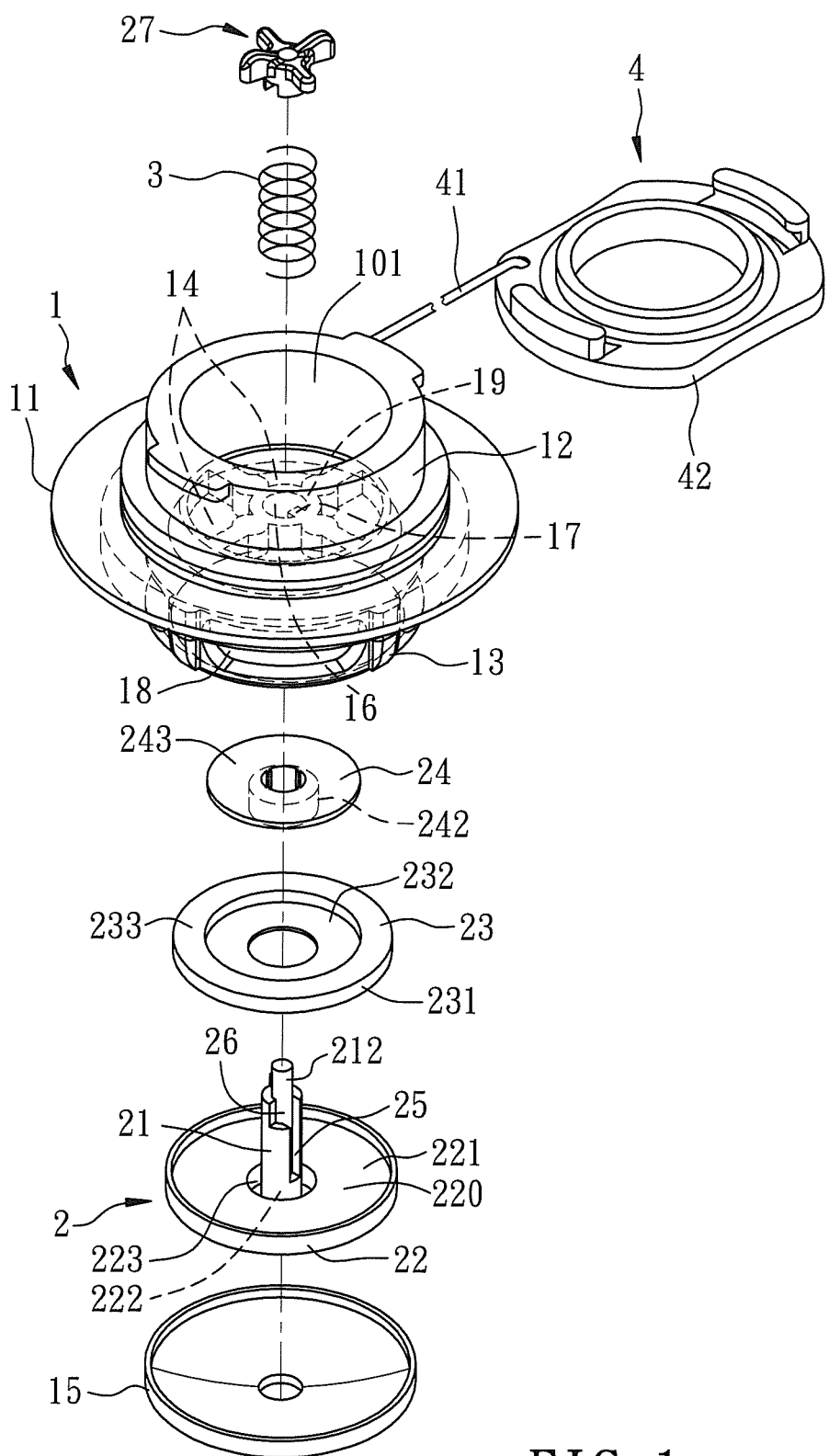
FIG. 1 is an exploded perspective view of the preferred embodiment of an air valve device according to this invention.
Figure 2:
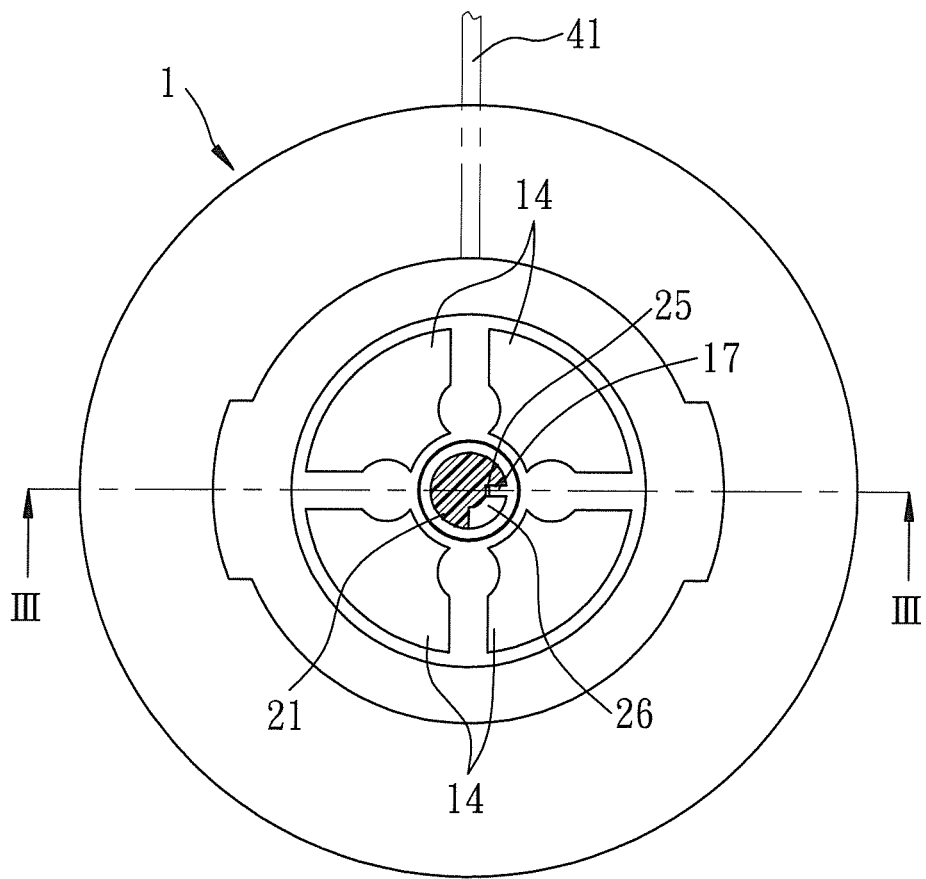
FIG. 2 is a partially sectioned fragmentary top view of the preferred embodiment.
Figure 3:
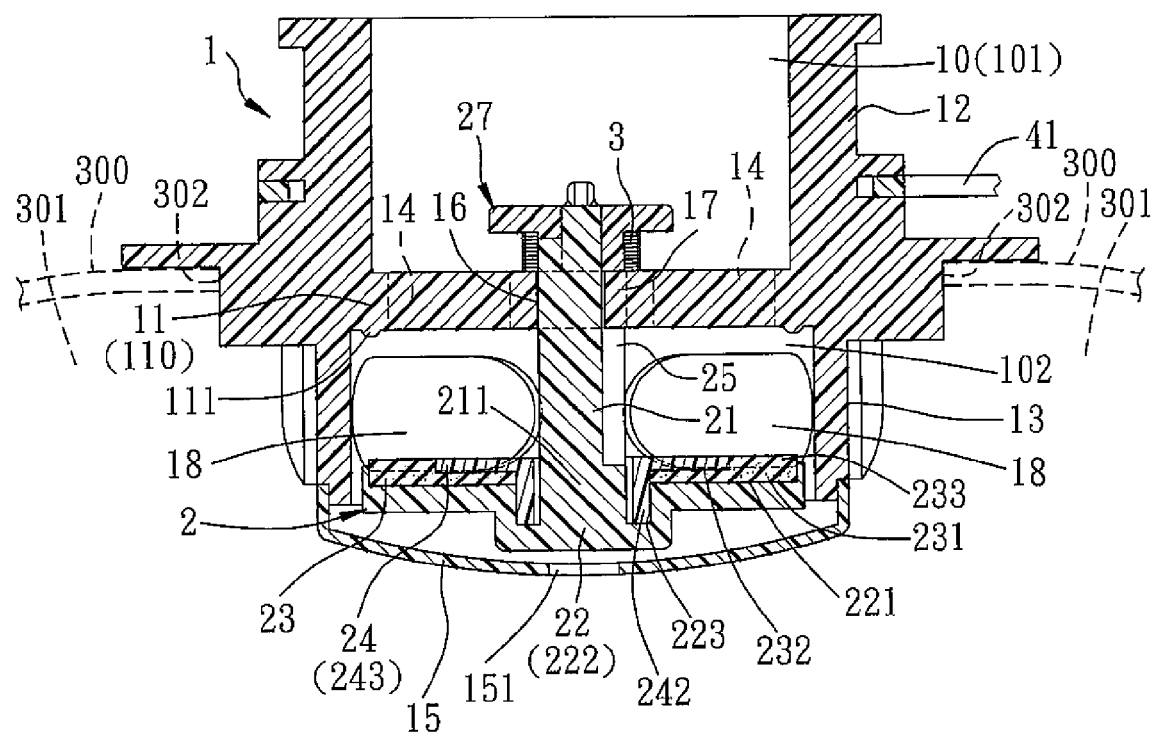
FIG. 3 is a cross-sectional view of the preferred embodiment taken along lines III-III of FIG. 2 when a valve disc unit is in an opened position.

Referring to FIGS. 1 to 3, the preferred embodiment of an air valve device according to the present invention is shown to comprise a valve seat 1, a valve disc unit 2, a plunger 21, a biasing member 3, and a valve cap unit 4.

The valve seat 1 is adapted to be fitted into an opening 302 of an inflatable article 300, and has a tubular wall 12 which surrounds and extends along an axis and which defines an accommodation space 10 to be fluidly communicated with an inflatable chamber 301 in the inflatable article 300, and an abutment mount 11 which extends from the tubular wall 12 radially and towards the axis to form a seat body 110. The seat body 110 is configured to divide the accommodation space 10 into an inflating port 101 distal from the inflatable chamber 301 and a conduit 102 proximate to the inflatable chamber 301, and has a plurality of communicating ports 14 to fluidly communicate the inflating port 101 with the conduit 102. The seat body 110 has an outer peripheral region 111 which surrounds the communicating ports 14. The valve seat 1 further has a hub member 19 which is connected to the tubular wall 12 through the seat body 110, and which defines therein amounting hole 16 that extends along the axis to communicate the inflating port 101 with the conduit 102. An engaging peg 17 is disposed on the hub member 19. A lower wall portion 13 of the tubular wall 12 has a plurality of communicating holes 18 formed therethrough to be fluidly communicated with the conduit 102. A caged guard member 15 is disposed to engage the lower wall portion 13 so as to enclose the conduit 102.

Figure 4:
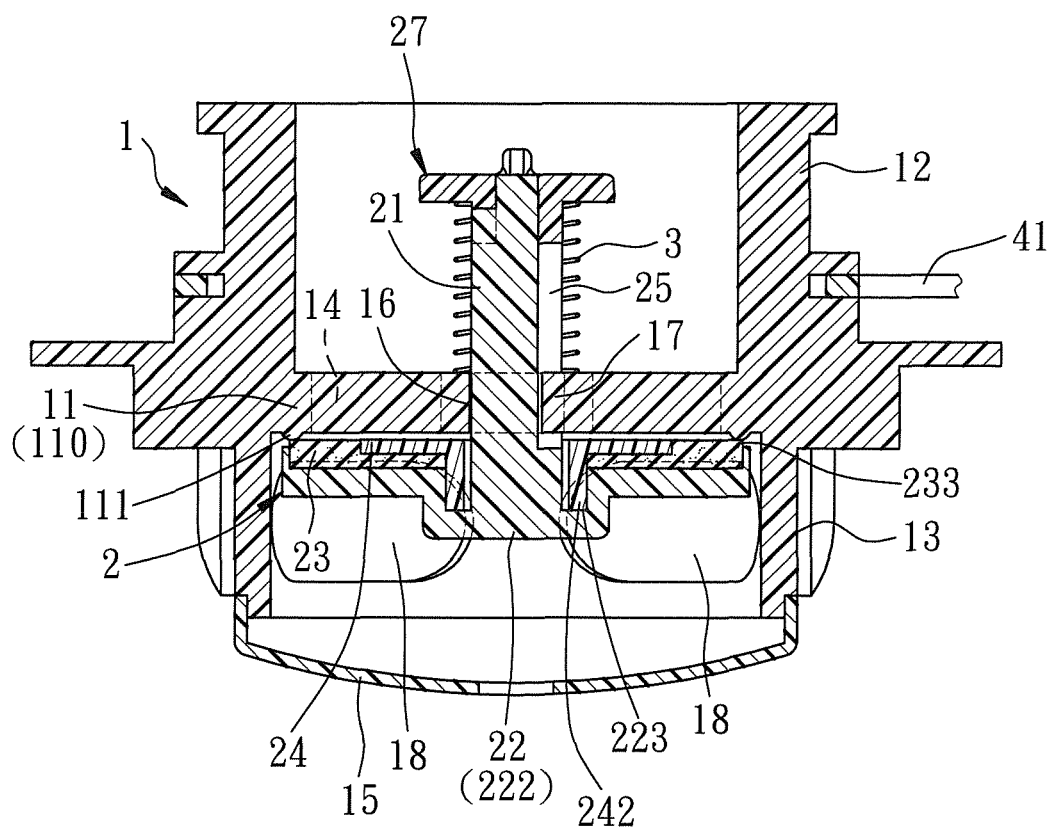
FIG. 4 is a view similar to FIG. 3, but showing the valve disc unit in a closed position.

The valve disc unit 2 is disposed in the conduit 102 and is movable relative to the abutment mount 11 along the axis between a closed position, as shown in FIG. 4, where the valve disc unit 2 is in air-tight engagement with the outer peripheral region 111 of the seat body 110 to shut off the communicating ports 14, and an opened position, as shown in FIG. 3, where the valve disc unit 2 is disengaged from the seat body 110 to permit air to flow through the communicating ports 14 to enter into or escape from the inflatable chamber 301.

Particularly, the valve disc unit 2 has a valve disc 22, an elastomeric seal ring 23, and a retaining cap 24. The valve disc 22 has a seat body-side surface 220 which is disposed to confront the seat body 110 and which has a central region 222, a padded region 221 that surrounds the central region 222, and an annular slot 223 that is disposed between the central and padded regions 222, 221 and that extends along the axis. The elastomeric seal ring 23 has a base layer 231 which is superimposed on the padded region 221, and an annular sealing marginal layer 233 which is disposed on the base layer 231 and which is abutted against and in air-tight engagement with the outer peripheral region 111 of the seat body 110 when the valve disc unit 2 is in the closed position. The sealing marginal layer 233 is of such a thickness as to cooperate with the base layer 231 to define an annular depression 232 that surrounds the axis. The retaining cap 24 is made from a material less deformable than the elastomeric seal ring 23, and has a hub portion 242 that extends along the axis to be press-fitted in the annular slot 223, and a surrounding web portion 243 that extends radially and outwardly from the hub portion 242, and that is fitted in the annular depression 232 so as to bring the base layer 231 in an abutting engagement with the padded region 221.

The plunger 21 has a connected end 211 which is connected to the central region 222, and a rod portion which extends from the connected end 211 along the axis through the hub portion 242 and the mounting hole 16 and which terminates at a head end 212 that is disposed in the inflating port 101. A plunger head 27 is engaged with and extends from the head end 212 in radial directions relative to the axis. Thus, the movement of the plunger 21 along the axis relative to the abutment mount 11 results in the movement of the valve disc unit 2 between the closed and opened positions.

The biasing member 3 is a coil spring 3 which surrounds the rod portion of the plunger 21 and which has two opposite ends abutting against the abutment mount 11 and the plunger head 27, respectively, so as to bias the plunger head 27 to move away from the abutment mount 11, thereby permitting the valve disc unit 2 to be held in the closed position.

In order to stabilize the axial movement of the plunger 21, the plunger 21 has a retaining groove which is formed in the rod portion and which includes a sliding groove segment 25 that extends in an axial direction parallel to the axis to permit the engaging peg 17 to slide along the sliding groove segment 25, and a retaining groove segment 26 that extends transversely from the sliding groove segment 25 such that, when the valve disc unit 2 is in the opened position, the plunger 21 is turned about the axis relative to the hub member 19 to permit the engaging peg 17 to be retained in the retaining groove segment 26, thereby holding the valve disc unit 2 in the opened position against the biasing action of the biasing member 3.

The valve cap unit 4 includes a valve cap 42 which is disposed to openably close the inflating port 101, and a connecting strip 41 which extends to interconnect the tubular wall 12 and the valve cap 42.

Additionally, the caged guard member 15 has an engaging area 151 disposed to be axially spaced apart from the valve disc 22 such that, when the valve disc unit 2 is moved to the opened position, the valve disc 22 is brought to engage the engaging area 151 to indicate that the valve disc unit 2 has reached the opened position.

As illustrated, by virtue of the rigid retaining cap 24 fitted in the annular slot 223 and the annular depression 232, the base layer 231 of the elastomeric seal ring 23 is brought in an abutting engagement with the padded region 221 so as to secure the seal ring 23 to the valve disc 22 while permitting the sealing marginal layer 233 to be in an air-tight engagement with the outer peripheral region 111 of the seat body 110 in the closed position.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

We claim:

1. An air valve device for an inflatable article which has an inflatable chamber and an opening fluidly communicated with the inflatable chamber, comprising:

a valve seat which is adapted to be fitted into the opening, and which has a tubular wall that surrounds and extends along an axis and that defines an accommodation space, and an abutment mount that extends from said tubular wall radially and towards the axis to form a seat body, said seat body being configured to divide said accommodation space into an inflating port distal from the inflatable chamber and a conduit proximate to the inflatable chamber, and having a communicating port to fluidly communicate said inflating port with said conduit, said valve seat further having a hub member which is connected to said tubular wall through said seat body, and which defines therein a mounting hole that extends along the axis to communicate said inflating port with said conduit;

a valve disc unit which is disposed in said conduit and which is movable relative to said abutment mount along the axis between a closed position, where said valve disc unit is in air-tight engagement with said seat body to shut off said communicating port, and an opened position, where said valve disc unit is disengaged from said seat body to permit air to flow through said communicating port to enter into or escape from the inflatable chamber, said valve disc unit having a valve disc having a seat body-side surface which is disposed to confront said seat body and which has a central region and a padded region that surrounds said central region, an elastomeric seal ring having a base layer which is superimposed on said padded region, and a sealing marginal layer which is disposed on said base layer and which is abutted against and in air-tight engagement with said seat body when said valve disc unit is in the closed position, said sealing marginal layer being of such a thickness as to cooperate with said base layer to define an annular depression that surrounds the axis, and a retaining cap which is made from a material less deformable than said elastomeric seal ring, and which has a hub portion and a surrounding web portion that extends radially and outwardly from said hub portion, and that is fitted in said annular depression so as to bring said base layer in an abutting engagement with said padded region;

a plunger having a connected end which is connected to said central region, and a rod portion which extends from said connected end along the axis through said hub portion and said mounting hole and which terminates at a head end that is disposed in said inflating port such that movement of said plunger along the axis relative to said abutment mount results in movement of said valve disc unit between the closed and opened positions; and a biasing member disposed to bias said head end to move away from said seat body so as to permit said valve disc unit to be held in the closed position;

wherein said valve disc has an annular slot which is disposed between said central and padded regions and which extends along the axis, said hub portion of said retaining cap extending along the axis from said surrounding web portion to be press-fitted in said annular slot.

2. The air valve device according to claim 1, wherein said seat body has an outer peripheral region which surrounds said communicating port to be abutted against and in air-tight engagement with said sealing marginal layer when said valve disc unit is in the closed position.

3. The air valve device according to claim 1, wherein said valve seat has an engaging peg which is disposed on said hub member, said plunger having a retaining groove which is formed in said rod portion and which includes a sliding groove segment that extends in an axial direction parallel to the axis to permit said engaging peg to slide along said sliding groove segment, and a retaining groove segment that extends transversely from said sliding groove segment such that, when said valve disc unit is in the opened position, said plunger is turned about the axis relative to said hub member to permit said engaging peg to be retained in said retaining groove segment, thereby holding said valve disc unit in the opened position against biasing action of said biasing member.

4. The air valve device according to claim 1, wherein said plunger further has a plunger head which extends from said head end in radial directions relative to the axis, said biasing member being a coil spring which surrounds said plunger and which has two opposite ends abutting against said abutment mount and said plunger head, respectively, so as to bias said plunger head to move away from said abutment mount.

5. The air valve device according to claim 1, further comprising a valve cap which is disposed to openably close said inflating port, and a connecting strip which extends to interconnect said tubular wall and said valve cap.

6. The air valve device according to claim 1, further comprising a caged guard member which is disposed to enclose said conduit, and which has an engaging area disposed to be axially spaced apart from said valve disc such that, when said valve disc unit is moved to the opened position, said valve disc is brought to engage said engaging area to indicate that said valve disc unit has reached the opened position.

* * * * *